US012662015B2

(12) United States Patent
Burjes et al.

(10) Patent No.: US 12,662,015 B2
(45) Date of Patent: Jun. 23, 2026

(54) ELECTRIC POWERTRAIN HAVING INTERAXLE ELECTRIC POWER TRANSFER

(71) Applicant: DEERE & COMPANY, Moline, IL (US)

(72) Inventors: Roger W. Burjes, Cedar Falls, IA (US); Michael A. Holland, Conrad, IA (US); Clayton P. Neumann, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 97 days.

(21) Appl. No.: 18/790,183

(22) Filed: Jul. 31, 2024

(65) Prior Publication Data

US 2025/0269764 A1     Aug. 28, 2025

Related U.S. Application Data

(60) Provisional application No. 63/557,362, filed on Feb. 23, 2024.

(51) Int. Cl.
B60L 58/15          (2019.01)
B60L 7/26           (2006.01)

(52) U.S. Cl.
CPC ................ B60L 58/15 (2019.02); B60L 7/26 (2013.01); *B60L 2200/40* (2013.01)

(58) Field of Classification Search
CPC ......... B60L 2200/40; B60L 58/15; B60L 7/26
See application file for complete search history.

(56) References Cited

U.S. PATENT DOCUMENTS

| | | | | | |
|---|---|---|---|---|---|
| 5,465,806 | A | * | 11/1995 | Higasa | B60L 50/51 |
| | | | | | 180/242 |
| 5,615,933 | A | * | 4/1997 | Kidston | B60T 1/10 |
| | | | | | 303/3 |
| 5,627,438 | A | * | 5/1997 | Barrett | B60L 3/04 |
| | | | | | 903/916 |
| 6,325,470 | B1 | * | 12/2001 | Schneider | B60L 7/26 |
| | | | | | 303/186 |
| 6,862,511 | B1 | * | 3/2005 | Phillips | B60K 6/52 |
| | | | | | 701/54 |
| 7,739,005 | B1 | * | 6/2010 | Tang | B60L 3/10 |
| | | | | | 701/69 |

(Continued)

FOREIGN PATENT DOCUMENTS

| | | |
|---|---|---|
| DE | 102022208606 A1 | 2/2023 |
| EP | 1094960 B1 | 12/2003 |

OTHER PUBLICATIONS

German Search Report issued in application No. 102024136823.3 dated Aug. 14, 2025, 10 pages.

*Primary Examiner* — Tyler J Lee

(57) ABSTRACT

An electric powertrain for a work vehicle including a first electric machine connected to a first axle, a second electric machine connected to a second axle, a battery connected to the first and second electric machines, a brake connected to the second axle, an actuator connected to the brake, and a controller configured to operate the first electric machine in a generator mode which generates electrical energy from the rotational energy of the first axle, the second electric machine in a motor mode which provides rotational energy to the second axle, and the actuator to apply the brake which absorbs rotational energy from the second axle.

20 Claims, 6 Drawing Sheets

(56)  References Cited

U.S. PATENT DOCUMENTS

| | | | | |
|---|---|---|---|---|
| 8,116,927 | B2* | 2/2012 | Yu | B60W 30/02 |
| | | | | 180/65.285 |
| 8,428,840 | B2* | 4/2013 | O'Dea | B60T 8/1755 |
| | | | | 701/90 |
| 8,738,207 | B2 | 5/2014 | Holmes et al. | |
| 9,469,199 | B1* | 10/2016 | Gauthier | B60L 3/106 |
| 10,343,525 | B2* | 7/2019 | Lian | B60L 15/36 |
| 11,351,983 | B2 | 6/2022 | Mckinzie et al. | |
| 11,505,176 | B2* | 11/2022 | Verbridge | B60W 30/18172 |
| 11,560,130 | B2* | 1/2023 | Westerhof | B60W 10/02 |
| 11,607,956 | B2 | 3/2023 | Vande Haar | |
| 11,872,885 | B2 | 1/2024 | Vande Haar et al. | |
| 2002/0163251 | A1* | 11/2002 | Crombez | B60K 6/46 |
| | | | | 903/947 |
| 2005/0151420 | A1* | 7/2005 | Crombez | B60K 6/44 |
| | | | | 903/947 |
| 2011/0172863 | A1* | 7/2011 | Yu | G16Z 99/00 |
| | | | | 180/65.285 |
| 2012/0109483 | A1* | 5/2012 | O'Dea | B60T 8/1755 |
| | | | | 903/903 |
| 2023/0063054 | A1* | 3/2023 | Maddi Reddy | B60W 50/14 |
| 2024/0149960 | A1* | 5/2024 | Bolduc | B62D 53/08 |

* cited by examiner

ELECTRIC POWERTRAIN HAVING INTERAXLE ELECTRIC POWER TRANSFER

CROSS-REFERENCE TO RELATED APPLICATIONS

This application claims the benefit of U.S. Provisional Application No. 63/557,362, titled ELECTRIC POWERTRAIN HAVING INTERAXLE ELECTRIC POWER TRANSFER, filed Feb. 23, 2024, which is hereby incorporated by reference.

FIELD OF THE DISCLOSURE

The present disclosure relates to an electric powertrain for a work vehicle.

BACKGROUND

Powertrains for work vehicles may include one or more types of onboard power sources to provide propulsion and other power during operation. In general, some work vehicles may contain an internal combustion engine. Other work vehicles may have electrical machines in addition to or instead of the internal combustion engine, and such electrical machines may operate as motors or generators to supply mechanical or electrical power to various components.

SUMMARY

According to an aspect of the present disclosure, an electric powertrain for a work vehicle includes a first electric machine connected to a first axle, a second electric machine connected to a second axle, a battery connected to the first and second electric machines, a brake connected to the second axle, an actuator connected to the brake, and a controller configured to operate the first electric machine in a generator mode which generates electrical energy from the rotational energy of the first axle, the second electric machine in a motor mode which provides rotational energy to the second axle, and the actuator to apply the brake which absorbs rotational energy from the second axle.

According to an aspect of the present disclosure, in a first mode, the controller is configured to direct substantially all the generated electrical energy from the first electric machine to the battery.

According to an aspect of the present disclosure, the controller is configured to direct the generated electrical energy from the first electric machine to the battery when the generated electrical energy from the first electric machine is at or below a charging current threshold of the battery.

According to an aspect of the present disclosure, in a second mode, the controller is configured to allocate the generated electrical energy from the first electric machine between the battery and the second electric machine.

According to an aspect of the present disclosure, the controller is configured to allocate the generated electrical energy from the first electric machine to the battery and the second electrical machine when the generated electrical energy from the first electric machine is above a charging current threshold of the battery.

According to an aspect of the present disclosure, the controller allocates a first portion of the generated electrical energy to the battery and a second portion of the generated electrical energy to the second electric machine, and the first portion is an amount at or below the charging current threshold of the battery.

According to an aspect of the present disclosure, in a third mode, the controller is configured to direct substantially all the generated electrical energy from the first electric machine to the second electric machine.

According to an aspect of the present disclosure, the controller is configured to allocate the generated electrical energy from the first electric machine to the second electrical machine when the generated electrical energy from the first electric machine is above a charging current threshold of the battery.

According to an aspect of the present disclosure, the controller is configured to operate the first electric machine in the generator mode, the second electric machine in the motor mode, and the actuator to apply the brake when the controller determines a requirement to reduce the speed of the work vehicle.

According to an aspect of the present disclosure, the controller is configured to determine a quantity of generated electrical current to send the battery, based on one or more of the amount of generated electrical energy, the charge status of the battery, and the temperature of the battery.

According to an aspect of the present disclosure, a work vehicle includes the electric powertrain disclosed in any of the implementations herein.

The above and other features will become apparent from the following detailed description and accompanying drawings.

BRIEF DESCRIPTION OF THE DRAWINGS

The detailed description refers to the accompanying figures in which.

Like reference numerals are used to indicate like elements throughout the several figures.

DETAILED DESCRIPTION

The embodiments or implementations disclosed in the above drawings and the following detailed description are not intended to be exhaustive or to limit the present disclosure to these embodiments or implementations.

Figure 1:
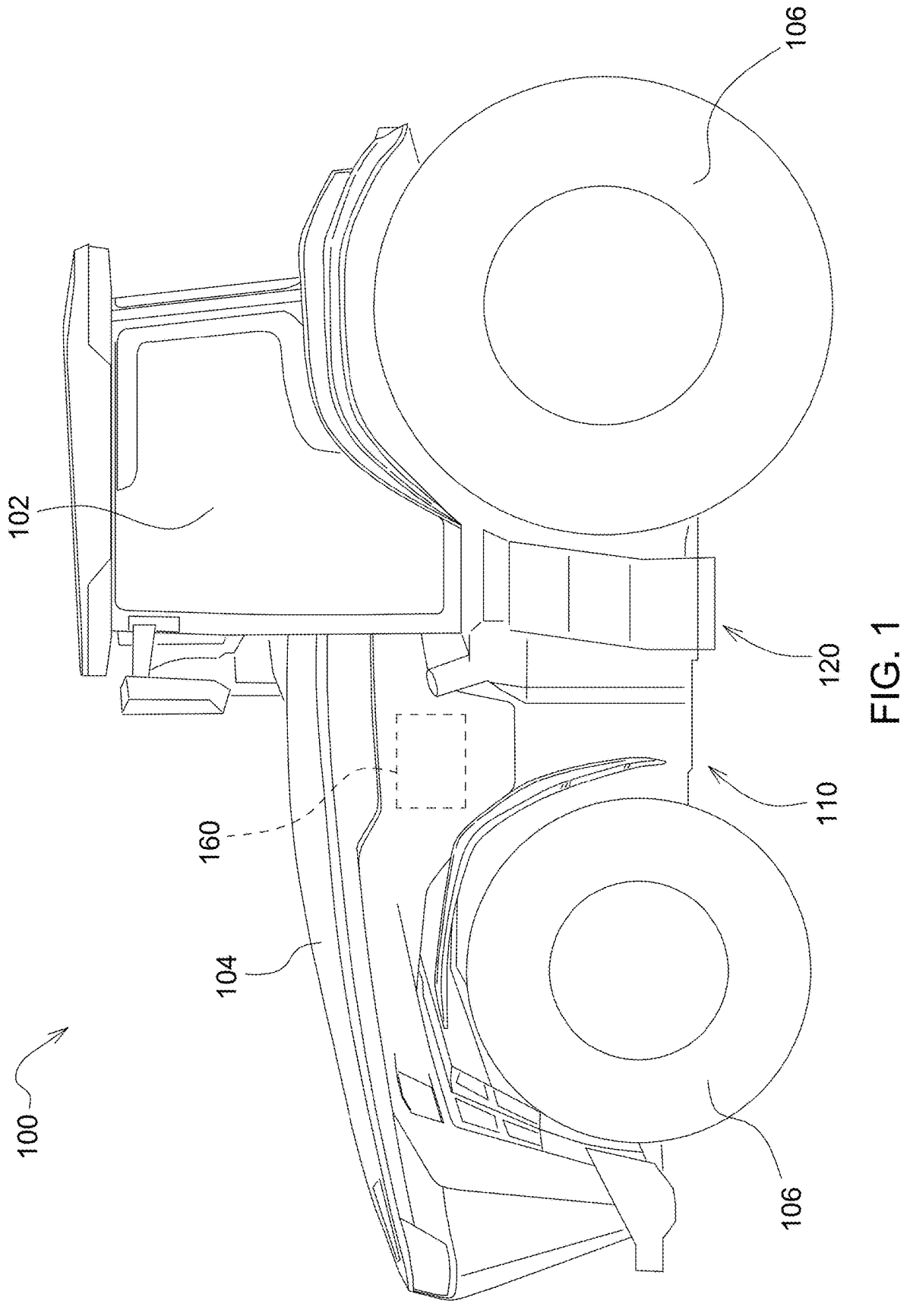
FIG. 1 is a perspective view of a work vehicle, according to an implementation.
Figure 2:
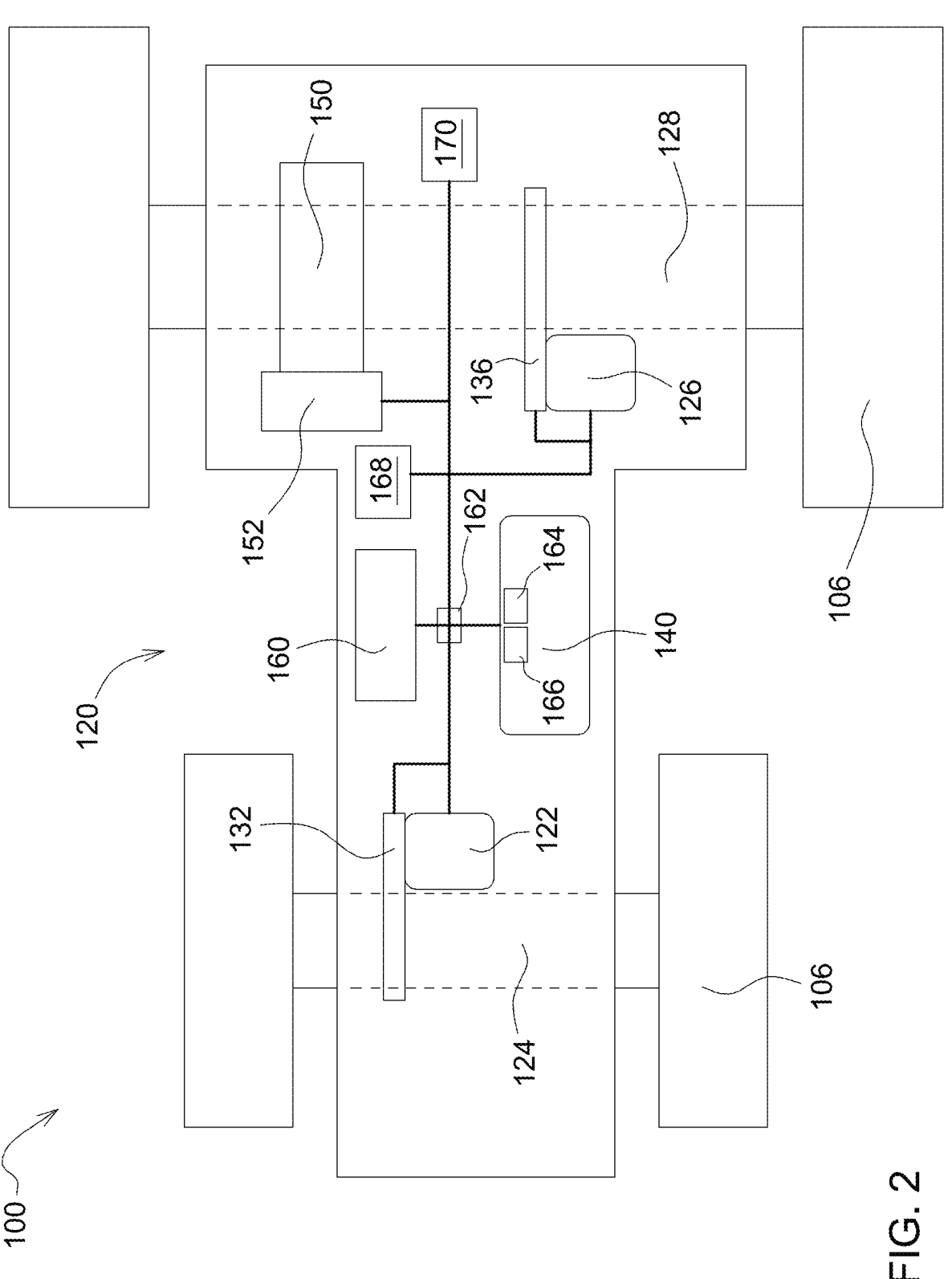
FIG. 2 is a schematic view of an electric powertrain, according to an implementation.
Figure 3:
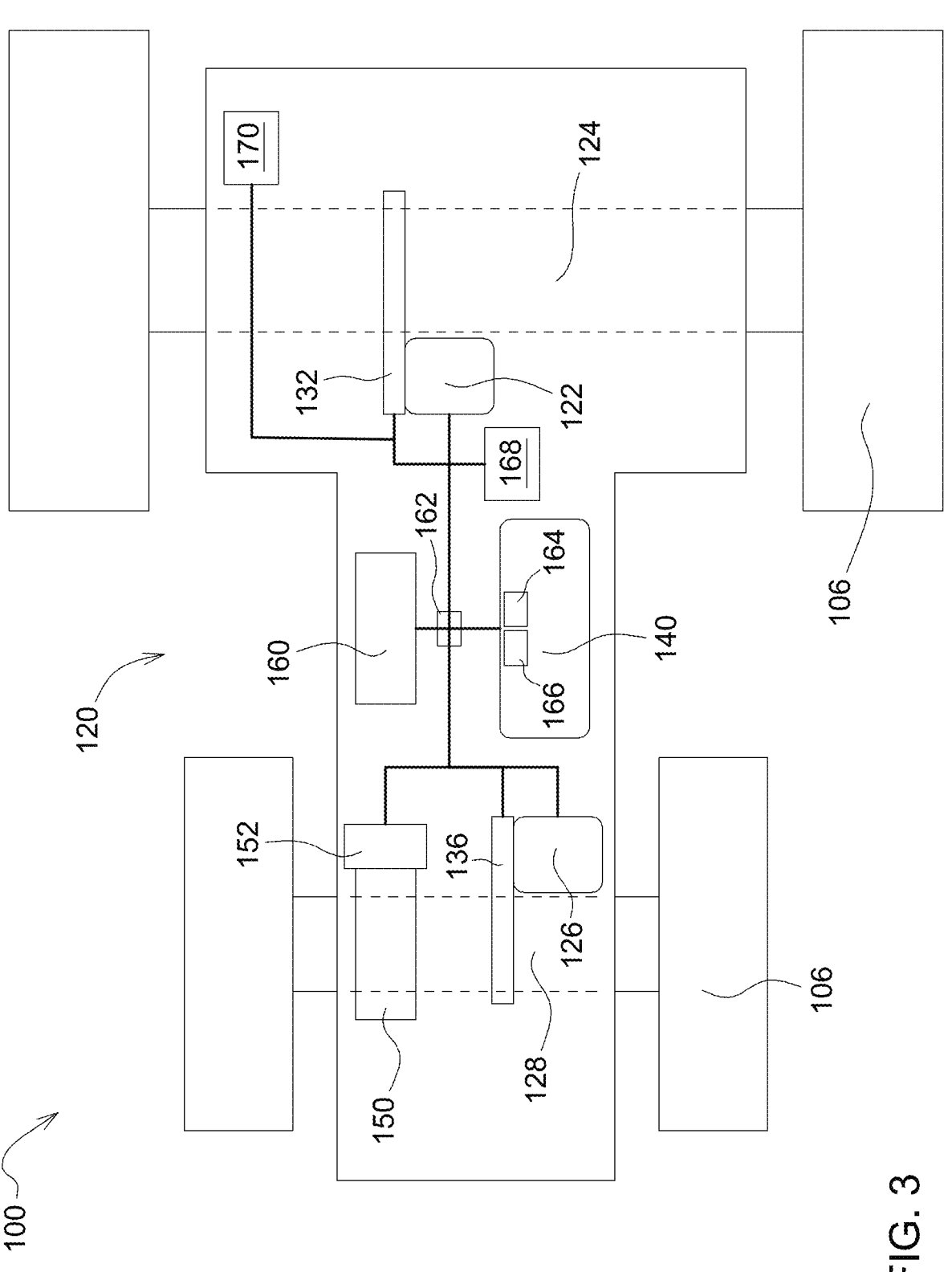
FIG. 3 is a schematic view of an electric powertrain, according to an implementation.
Figure 4:
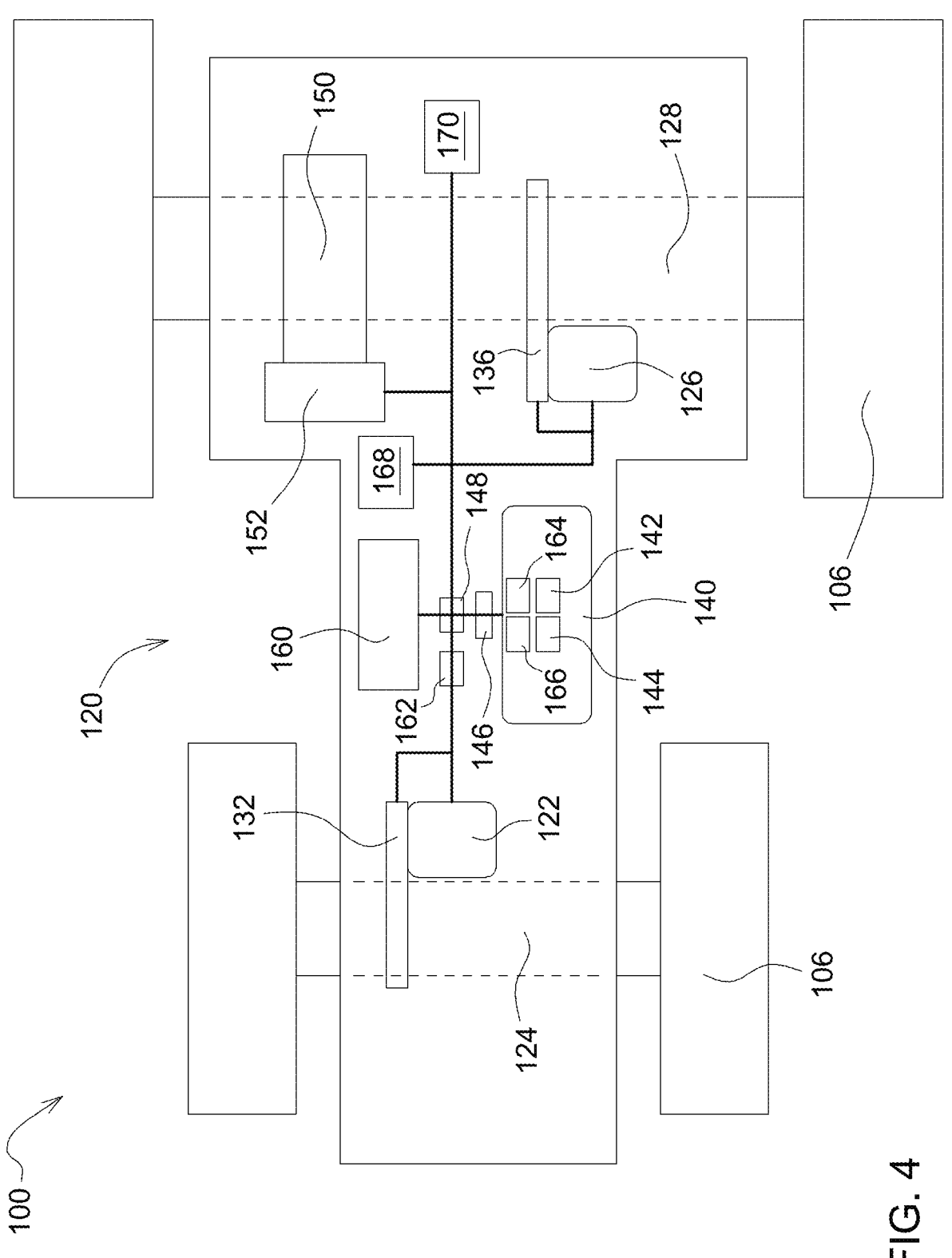
FIG. 4 is a schematic view of an electric powertrain, according to an implementation.
Figure 5:
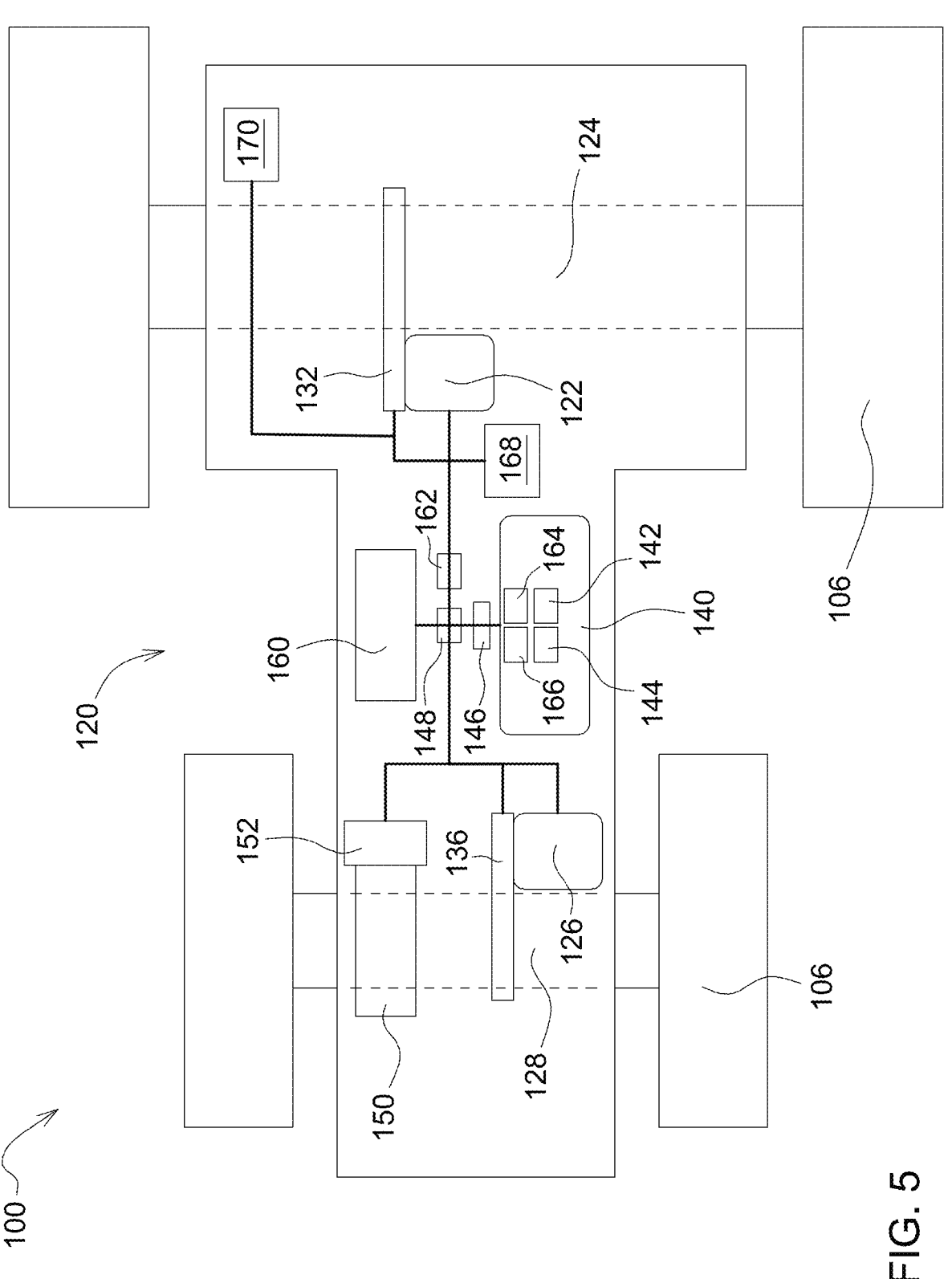
FIG. 5 is a schematic view of an electric powertrain, according to an implementation.
Figure 6:
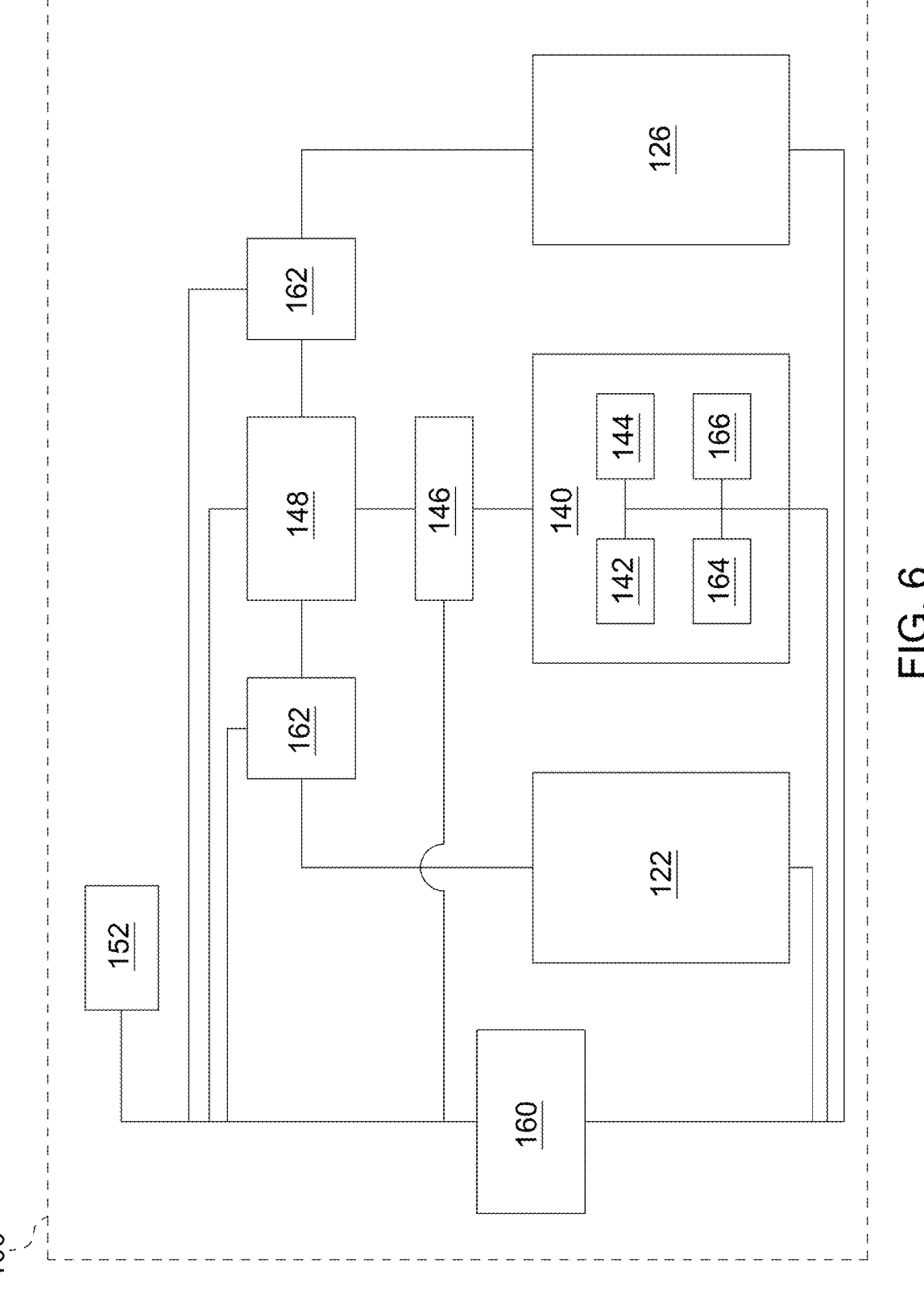
FIG. 6 is a schematic view of an electric powertrain, according to an implementation.

With reference to FIG. 1, a work vehicle 100, for example an agricultural tractor, can include an operator station or cab 102, a hood 104, one or more ground engaging apparatus 106, for example wheels or track assemblies, and a frame or chassis 110. The work vehicle 100 can include an operator interface having any number and combination of electronic devices, such as an interactive display. The work vehicle 100 can have a rigid or an articulated frame 110. The work vehicle 100 can include an electric powertrain 120 providing power to one or more ground engaging apparatus 106 and one or more power take off (PTO) shafts or other auxiliary power outputs or inputs. This disclosure also applies to other types of work vehicles in agriculture, construction, forestry, and road building.

With reference to FIGS. 2-6, an electric powertrain 120 includes a first axle 124 and a second axle 128. The first and second axles 124, 128 can be either front or rear axles. A first electric machine 122 is connected to the first axle 124 and a second electric machine 126 is connected to the second axle 128. The first electric machine 122 can connect to the first axle 124 via a first gearbox 132. The second electric machine 126 can connect to the second axle 128 via a second gearbox 136. The first and second gearboxes 132, 136 can include one or more sets of gears having one or more gear ratios between the first and second electric machines 122, 126 and the first and second axles 124, 128. The first and second gearboxes 132, 136 can include one or more clutches. The first and second electric machines 122, 126 can be DC or AC electric machines (e.g., DC or AC motor/generators).

An electrical energy storage device 140 (e.g., an electric battery) is connected to the first and second electric machines 122, 126. The electrical energy storage device 140 can include one or more batteries, each having one or more cells. The electrical energy storage device 140 can have an operational status, a charge level status, and a temperature status. The electrical energy storage device 140 can have a charging current limit or threshold. A battery management system (BMS) 142 can monitor and manage the health and status of the electrical energy storage device 140. Hereinafter, the electrical energy storage device 140 will be referred to as a battery 140.

The electric powertrain 120 can include one or more power converters 146 (e.g., converter, inventor, etc.) positioned between the battery 140 and the first and second electric machines 122, 126. The one or more power converters 146 can be positioned near one or more of the first electric machine 122, the second electric machine 126, and the battery 140. The one or more power converters 146 can be a DC-to-DC converter, when the first and second electric machines 122, 126 are DC electric machines, or an AC-to-DC inverter, when the first and second electric machines 122, 126 are AC electric machines. The electric powertrain 120 can include one or more relays or switches 148 positioned between the battery 140 and the first and second electric machines 122, 126. The one or more switches 148 can connect and disconnect the first and second electric machines 122, 126 to or from each other and the battery 140.

A brake 150 (e.g., friction brake) can be connected to one of the first axle 124 and the second axle 128. According to some implementations, the brake 150 is connected to only one of the first and second axles 124, 128. The brake 150 includes an applied mode and a released mode. An actuator 152 can apply and release the brake 150. The actuator 152 can include a hydraulic, pneumatic, or electrical actuator 152 (e.g., hydraulic cylinder, pneumatic cylinder, or linear actuator).

The first and second electric machines 122, 126 each have a generator mode generating electrical energy and a motor mode producing mechanical or rotational energy. In the generator mode, each of the first and second electric machines 122, 126 can operate as a generator, which creates an electrical current (e.g., an AC or DC current) generated from rotational energy or power. In the motor mode, each of the first and second electric machines 122, 126 can operate as a motor, which produces rotational energy or power in response to an electrical current (e.g., an AC or DC current). The first and second electric machines 122, 126 can be any type of AC or DC electric machine (e.g., any type of motor-generator). Each of the first and second electric machines 122, 126 can provide electrical energy to recharge the battery 140, to the other electric machine, to the actuator 152, to other electrical or electric components, storage devices, or consumers, or to any combination of the preceding.

An electronic control unit or controller 160 is connected to the first and second electric machines 122, 126, the battery 140, and the actuator 152. The controller 160 can direct electrical energy to or from the first and second electric machines 122, 126, the battery 140, the actuator 152, and other electric components, storage devices, and consumers. The controller 160 can operate each of the first and second electric machines 122, 126 in the generator or motor mode. The controller 160 can operate the one or more relays or switches 148 to direct or allocate the electrical energy between the first and second electric machines 122, 126, the battery 140, the actuator 152, and other electric components, storage devices, and consumers.

In one example, the controller 160 can operate the first and second electric machines 122, 126 in the motor mode. The battery 140 provides electrical energy to the first and second electric machines 122, 126. The controller 160 can direct electrical energy from the battery 140 to the first and second electric machines 122, 126 in any allocation based in part on traction, terrain, vehicle speed, work operation, obstacles, draft load, operator input, etc.

In another example, the controller 160 can operate both the first and second electric machines 122, 126 in the generator mode. The controller 160 can direct the generated electrical energy from the first and second electric machines 122, 126 to one or more of the battery 140, the actuator 152, and other electric components, storage devices, or consumers. The controller 160 can use this operation to reduce the speed (e.g., slow or stop) of the work vehicle 100.

In another example, the controller 160 can operate the first electric machine 122 in the generator mode and the second electric machine 126 in the motor mode. In a first mode, the controller 160 directs all or substantially all the generated electrical energy from the first electric machine 122 to the battery 140. In a second mode, the controller 160 allocates or distributes the generated electrical energy from the first electric machine 122 between the battery 140 and the second electric machine 126. In a third mode, the controller 160 directs all or substantially all the generated electrical energy from the first electric machine 122 to the second electric machine 126. The controller 160 can use this operation to reduce the speed of the work vehicle 100.

In another example, the controller 160 can operate the first electric machine 122 in the motor mode and the second electric machine 126 in the generator mode. The controller 160 can direct the generated electrical energy from the second electric machine 126 to one or more of the first electric machine 122, the battery 140, the actuator 152, and other electric components, storage devices, or consumers. The controller 160 can use this operation to reduce the speed of the work vehicle 100.

The controller 160 can determine when to direct electrical energy to or from the first and second electric machines 122, 126, the battery 140, the actuator 152, and other electric components, storage devices, and consumers. For example, when the controller 160 determines there is a need, requirement, intent, or request to reduce the speed of the work vehicle 100, the controller 160 can operate one or more of the first and second electric machines 122, 126 in the generator mode. The controller 160 can determine there is a need, requirement, intent, or request to reduce the speed of the work vehicle 100 based in part on terrain, vehicle speed, work operation, obstacles, operator input, etc.

The controller 160 can direct the generated electrical energy from the first and second electric machines 122, 126 to recharge the battery 140. The controller 160 can determine whether to charge the battery 140, and a quantity of electrical current to send the battery 140, based on one or more of the following: the amount of generated electrical energy or current, the charge status or condition of the battery 140, the temperature of the battery 140, the age of the battery 140, the demand for electrical current from other electric components, storage devices, or consumers, and the status or condition of any systems of the work vehicle 100.

The controller 160 is connected to and communicates with the sensors described herein. The controller 160 can determine the amount of generated electrical energy or current from the first and second electric machines 122, 126 measured by one or more current sensors 162 positioned anywhere in the electrical circuit connecting the first and second electric machines 122, 126 with the battery 140. The controller 160 can determine the health and status of the battery 140 measured by one or more sensors 144, 164, 166 or the battery management system 142. The controller 160 can determine the charge status or condition (e.g., state of charge or SoC) of the battery 140 measured by a voltage sensor 164, one or more other sensors 144, or the battery management system 142. The controller 160 can determine the temperature of the battery 140 measured by a temperature sensor 166, one or more other sensors 144, or the battery management system 142. The controller 160 can determine the demand for electrical current from other electric components, storage devices, or consumers measured by one or more current sensors 168. The controller 160 can determine the status or condition of the systems of the work vehicle 100 measured by various other sensors 170 (e.g., speed sensor, torque sensor, inclinometer sensor, location sensor, position sensor, etc.).

The controller 160 is connected to and communicates with the one or more power converters 146 and the one or more relays or switches 148. The controller 160 can control the one or more switches 148 to connect or disconnect the first electric machine 122 to or from the second electric machine 126, the battery 140, or both. The controller 160 can control the one or more switches 148 to connect or disconnect the second electric machine 126 to or from the first electric machine 122, the battery 140, or both. The controller 160 can operate the one or more relays or switches 148 to direct or allocate the electrical current between the first and second electric machines 122, 126 and the battery 140.

When the controller 160 determines the generated electrical energy from one or more of the first and second electric machines 122, 126 is at or below the charging current threshold of the battery 140, then the controller 160 can direct the generated electrical energy to the battery 140. According to some implementations, the controller 160 can perform additional evaluations or assessments before directing any generated electrical energy to the battery 140. The controller 160 can determine whether the operational status of the battery 140 is functioning or malfunctioning based in part on one or more sensors 144, 164, 166 or a controller 142 (e.g., battery management system) providing the operational status. The controller 160 can determine whether the charge level status is below, at, or above a preselected charge level (e.g., charge percentage) based in part on the voltage sensor 164 or battery management system 142. The controller 160 can determine whether the temperature status is below, at, or above a preselected temperature based in part on the temperature sensor 166 or battery management system 142. The controller 160 can determine to direct or allocate the generated electrical energy to the battery 140 when the battery 140 is functioning, below the preselected charge level, and below the preselected temperature.

When the controller 160 determines the generated electrical energy from one or more of the first and second electric machines 122, 126 is above the charging current threshold of the battery 140, then the controller 160 can operate the first electric machine 122 in generator mode, operate the second electric machine 126 in the motor mode, operate the actuator 152 to apply the brake 150, and allocate the generated electrical energy from the first electric machine 122 between the battery 140 and the second electrical machine 126. The first electric machine 122 converts rotational energy from the first axle 124 into electrical energy. The second electric machine 126 converts electrical energy into rotational energy for the second axle 128. The brake 150 absorbs or removes rotational energy from the second axle 128. The controller 160 can direct or allocate a first portion of the generated electrical energy to the battery 140 and a second portion of the generated electrical energy to the second electric machine 126. The first portion can be any amount at or below the charging current threshold of the battery 140, and the second portion is any remaining or excess amount.

The electronic control unit or controller 160 can have one or more microprocessor-based electronic control units or controllers, which perform calculations and comparisons and execute instructions, for example algorithms. The controller includes a processor, a core, volatile and non-volatile memory, digital and analog inputs, and digital and analog outputs. The controller can include non-transitory, computer readable memory, such as random-access memory (RAM), read only memory (ROM), or electrically erasable programmable read only memory (EEPROM), which include instructions for execution by the processor, for example algorithms. The controller connects to and communicates with various input and output devices including, but not limited to, switches, relays, solenoids, actuators, light emitting diodes (LED's), passive and interactive displays, radio frequency devices (RFD's), sensors, and other controllers. The controller receives communications or signals, via electrically or any suitable electromagnetic communication, from one or more devices, determines an appropriate response or action, and sends communications or signals to one or more devices. The controller can be a microprocessor, an application specific integrated circuit (ASIC), a digital processor, or a programmable logic controller, also known as a PLC or programmable controller. The controller can connect to and communicate with an electronic control system of the work vehicle 100, the electric powertrain 120, or both through a data bus, such as a CAN bus, or the controller can be a part the electronic control system of the work vehicle 100, the electric powertrain 120, or both.

The terminology used herein is for the purpose of describing example embodiments or implementations and is not intended to be limiting of the disclosure. As used herein, the singular forms "a," "an," and "the" are intended to include the plural forms as well, unless the context clearly indicates otherwise. It will be further understood that the any use of the terms "has," "includes," "comprises," or the like, in this specification, identifies the presence of stated features, integers, steps, operations, elements, and/or components, but does not preclude the presence or addition of one or more other features, integers, steps, operations, elements, components, and/or groups thereof.

Those having ordinary skill in the art will recognize that terms such as "above," "below," "upward," "downward," "top," "bottom," etc., are used descriptively for the figures, and do not represent limitations on the scope of the present disclosure, as defined by the appended claims. Furthermore, the teachings may be described herein in terms of functional and/or logical block components or various processing steps, which may include any number of hardware, software, and/or firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described embodiments or implementations.

As used herein, "e.g.," is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example embodiments or implementations of the present disclosure, these descriptions should not be viewed in a restrictive or limiting sense. Rather, there are several variations and modifications which may be made without departing from the scope of the appended claims.

What is claimed is:

1. An electric powertrain for a work vehicle, comprising:
a first electric machine connected to a first axle;
a second electric machine connected to a second axle;
a battery connected to the first and second electric machines;
a brake connected to the second axle;
an actuator connected to the brake; and
a controller configured to operate the first electric machine in a generator mode which generates electrical energy from the rotational energy of the first axle, the second electric machine in a motor mode which provides rotational energy to the second axle, and the actuator to apply the brake which absorbs rotational energy from the second axle;
in a first mode, the controller is configured to direct substantially all the generated electrical energy from the first electric machine to the battery when the generated electrical energy from the first electric machine is at or below a charging current threshold of the battery.

2. The electric powertrain of claim 1, wherein in a second mode, the controller is configured to allocate the generated electrical energy from the first electric machine between the battery and the second electric machine.

3. The electric powertrain of claim 1, wherein in a second mode the controller is configured to allocate the generated electrical energy from the first electric machine between the battery and the second electrical machine when the generated electrical energy from the first electric machine is above a charging current threshold of the battery.

4. The electric powertrain of claim 1, wherein in a second mode the controller is configured to allocate a first portion of the generated electrical energy from the first electric machine to the battery and a second portion of the generated electrical energy from the first electric machine to the second electric machine, and the first portion is an amount at or below the charging current threshold of the battery.

5. The electric powertrain of claim 1, wherein in a third mode, the controller is configured to direct substantially all the generated electrical energy from the first electric machine to the second electric machine.

6. The electric powertrain of claim 5, wherein the controller is configured to allocate the generated electrical energy from the first electric machine to the second electrical machine when the generated electrical energy from the first electric machine is above a charging current threshold of the battery.

7. The electric powertrain of claim 1, wherein the controller is configured to operate the first electric machine in the generator mode, the second electric machine in the motor mode, and the actuator to apply the brake when the controller determines a requirement to reduce the speed of the work vehicle.

8. The electric powertrain of claim 1, wherein the controller is configured to determine a quantity of generated electrical current to send the battery, based on one or more of the amount of generated electrical energy, the charge status of the battery, and the temperature of the battery.

9. A work vehicle having an electric powertrain, comprising:
a first electric machine connected to a first axle;
a second electric machine connected to a second axle;
a battery connected to the first and second electric machines;
a brake connected to the second axle;
an actuator connected to the brake; and
a controller configured to operate the first electric machine in a generator mode which generates electrical energy from the rotational energy of the first axle, the second electric machine in a motor mode which provides rotational energy to the second axle, and the actuator to apply the brake which absorbs rotational energy from the second axle;
in a first mode, the controller is configured to direct substantially all the generated electrical energy from the first electric machine to the battery when the generated electrical energy from the first electric machine is at or below a charging current threshold of the battery.

10. The work vehicle powertrain of claim 9, wherein in a second mode, the controller is configured to allocate the generated electrical energy from the first electric machine between the battery and the second electric machine.

11. The work vehicle of claim 9, wherein in a second mode the controller is configured to allocate the generated electrical energy from the first electric machine between the battery and the second electrical machine when the generated electrical energy from the first electric machine is above a charging current threshold of the battery.

12. The work vehicle of claim 9, wherein in a second mode the controller is configured to allocate a first portion of the generated electrical energy from the first electric machine to the battery and a second portion of the generated electrical energy from the first electric machine to the second electric machine, and the first portion is an amount at or below the charging current threshold of the battery.

13. The work vehicle of claim 9, wherein in a third mode, the controller is configured to direct substantially all the generated electrical energy from the first electric machine to the second electric machine.

14. The work vehicle of claim 13, wherein the controller is configured to allocate the generated electrical energy from the first electric machine to the second electrical machine when the generated electrical energy from the first electric machine is above a charging current threshold of the battery.

15. The work vehicle of claim 9, wherein the controller is configured to operate the first electric machine in the generator mode, the second electric machine in the motor mode, and the actuator to apply the brake when the controller determines a requirement to reduce the speed of the work vehicle.

16. The work vehicle of claim 9, wherein the controller is configured to determine a quantity of generated electrical current to send the battery, based on one or more of the amount of generated electrical energy, the charge status of the battery, and the temperature of the battery.

17. An electric powertrain for a work vehicle, comprising:
a first electric machine connected to a first axle;
a second electric machine connected to a second axle;
a battery connected to the first and second electric machines;
a brake connected to the second axle;
an actuator connected to the brake; and
a controller configured to operate the first electric machine in a generator mode which generates electrical energy from the rotational energy of the first axle, the second electric machine in a motor mode which provides rotational energy to the second axle, and the actuator to apply the brake which absorbs rotational energy from the second axle, the controller configured to allocate the generated electrical energy from the first electric machine between the battery and the second electrical machine when the generated electrical energy from the first electric machine is above a charging current threshold of the battery.

18. An electric powertrain for a work vehicle, comprising:
a first electric machine connected to a first axle;
a second electric machine connected to a second axle;
a battery connected to the first and second electric machines;
a brake connected to the second axle;
an actuator connected to the brake; and
a controller configured to operate the first electric machine in a generator mode which generates electrical energy from the rotational energy of the first axle, the second electric machine in a motor mode which provides rotational energy to the second axle, and the actuator to apply the brake which absorbs rotational energy from the second axle, the controller configured to allocate a first portion of the generated electrical energy from the first electric machine to the battery and a second portion of the generated electrical energy from the first electric machine to the second electric machine, the first portion being an amount at or below the charging current threshold of the battery.

19. An electric powertrain for a work vehicle, comprising:
a first electric machine connected to a first axle;
a second electric machine connected to a second axle;
a battery connected to the first and second electric machines;
a brake connected to the second axle;
an actuator connected to the brake; and
a controller configured to operate the first electric machine in a generator mode which generates electrical energy from the rotational energy of the first axle, the second electric machine in a motor mode which provides rotational energy to the second axle, and the actuator to apply the brake which absorbs rotational energy from the second axle, the controller configured to allocate substantially all the generated electrical energy from the first electric machine to the second electrical machine when the generated electrical energy from the first electric machine is above a charging current threshold of the battery.

20. An electric powertrain for a work vehicle, comprising:
a first electric machine connected to a first axle;
a second electric machine connected to a second axle;
a battery connected to the first and second electric machines;
a brake connected to the second axle;
an actuator connected to the brake; and
a controller configured to operate the first electric machine in a generator mode which generates electrical energy from the rotational energy of the first axle, the second electric machine in a motor mode which provides rotational energy to the second axle, and the actuator to apply the brake which absorbs rotational energy from the second axle;
in a first mode, the controller is configured to direct the generated electrical energy from the first electric machine to the battery when the generated electrical energy from the first electric machine is at or below a charging current threshold of the battery;
in a second mode, the controller is configured to allocate a first portion of the generated electrical energy from the first electric machine to the battery and a second portion of the generated electrical energy from the first electric machine to the second electric machine, and the first portion is an amount at or below the charging current threshold of the battery, and
in a third mode, the controller is configured to direct substantially all the generated electrical energy from the first electric machine to the second electric machine when the generated electrical energy from the first electric machine is above a charging current threshold of the battery.

* * * * *